United States Patent [19]
Kaneko

[11] 3,741,094
[45] June 26, 1973

[54] FLASH PHOTOGRAPHY WARNING DEVICE
[75] Inventor: Hirokazu Kaneko, Ota-ku, Tokyo, Japan
[73] Assignee: Kabushiki Kaisha Ricoh, Ricoh, Japan
[22] Filed: Oct. 8, 1971
[21] Appl. No.: 187,611

[30] Foreign Application Priority Data
Oct. 14, 1970 Japan.................. 45/90201

[52] U.S. Cl.................... 95/11 L, 95/10 C, 240/1.3
[51] Int. Cl....................... G03b 15/04, G03b 17/20
[58] Field of Search............ 95/11 L, 11 R, 11.5 R, 95/10 C; 240/1.3; 431/92, 93

[56] References Cited
UNITED STATES PATENTS
| | | | |
|---|---|---|---|
| 3,374,718 | 3/1968 | Hochreiter | 95/11.5 R X |
| 3,589,255 | 6/1971 | Harvey | 95/11 R |
| 3,646,864 | 8/1969 | Hochreiter | 95/11.5 R |
| 3,602,120 | 8/1971 | Galbraith | 95/11.5 R |
| 3,616,735 | 11/1971 | Bresson | 95/11.5 R |

Primary Examiner—Robert P. Greiner
Attorney—Milton J. Wayne et al.

[57] ABSTRACT

A main underexposure warning switch is connected in series between one pole of a power source and a warning lamp while a parallel-connected circuit of a auxiliary underexposure warning switch and a switch for indication of a mounted fired flashbulb is interconnected between the other pole of the power source and the warning lamp in such a manner that the auxiliary underexposure warning switch may be normally closed when no flashbulb is mounted on a camera and opened when the flashbulb is mounted. Upon downward movement of a shutter release plate, the underexposure warning switch is not closed when the brightness of scene is sufficient to actuate and permit the use of an automatic exposure control device. When the brightness of scene is so dark that flash photography is required, and when a flashbulb is not mounted on the camera, the underexposure warning switch is closed to turn on the warning lamp. When a flashbulb which has been already fired is still mounted, the auxiliary underexposure warning switch is opened but the switch for indication of a fired flashbulb is closed to turn on the warning lamp.

8 Claims, 2 Drawing Figures 3,741,094

FLASH PHOTOGRAPHY WARNING DEVICE

BACKGROUND OF THE INVENTION

The present invention relates to a flash photography warning device, and more particularly a flash photography warning device for use in a camera of the type incorporating a device for actuating a percussive type flashbulb, the warning device being capable of giving a warning when a flashbulb which has been already fired or used is still mounted and a flash photography is required.

In automatic exposure control cameras, there has been known a warning device of the type in which when the brightness of the scene is not sufficient to actuate the automatic exposure control mechanism or when a shutter speed is too slow so that it is not possible to depress a shutter release button by a finger, a warning signal is viewed in the field of the viewfinder giving a warning to an operator that flash photography is necessary. In the cameras provided with a device for firing a flashbulb by applying mechanical impact, there has been widely used a warning device of the type which gives a warning signal in the field of the viewfinder in response to a shutter release operation when a flashbulb which has been already fired is still in firing position. In that case a new flashbulb may be brought to the firing position by manually rotating the flashbulb assembly or by mounting a new flashbulb assembly. There has been known a camera of the type in which the above two warning signals may be viewed independently in the field of the viewfinder, but it is not preferable to provide such arrangement because of the complicated construction and assembly. Moreover, the large number of elements in such warning device results in expensive cost and frequent failures of the device. Furthermore, it is very difficult for an operator to distinguish which signal indicates which warning.

SUMMARY OF THE INVENTION

One of the objects of the present invention is, therefore, to provide a flash photography warning device of the type capable of giving a warning with one warning lamp that a flashbulb is required for photography and/or a flashbulb mounted has been already fired.

Another object of the present invention is to provide the flash photography device of the type described that is simple in construction, compact in size, reliable in operation and inexpensive to manufacture.

A still further object of the present invention is to provide the flash photography warning device of the type described and capable of displaying two different warning signals by one common warning lamp so that the operator may easily and simply perceive them.

To accomplish the above and other objects of the present invention and to overcome the defects encountered in the prior art devices, a common warning lamp is disposed so as to be viewed in the field of a viewfinder of a camera when it is turned on. Between the warning lamp and a power source are interconnected in parallel an auxiliary underexposure warning switch which is opened when a flashbulb or flashbulb assembly is mounted on a camera but is closed when it is not mounted and a normally open switch which is closed when a flashbulb that has been already fired is still in the trigger position even when flash photography is required. Therefore, according to the present invention only one warning lamp is used to give a warning that a flash photography is required when the brightness of a subject is not sufficient to actuate and permit the use of an automatic exposure control device and another warning that a flashbulb or flashbulb assembly mounted has been already fired so that a new flashbulb is required or the flashbulb assembly must be rotated to bring a new flashbulb into the firing position.

An underexposure warning switch is connected in series between one pole of a power source and the warning lamp while the parallel-circuit of the auxiliary underexposure warning switch and the switch for indication of a fired flashbulb is interconnected between the other pole of the power source and the warning lamp. When a flashbulb or flashbulb assembly is not mounted on the camera, the auxiliary underexposure warning switch is closed, but is opened when the flashbulb or flashbulb assembly is mounted. The underexposure warning meter and the switch for indication of a fired flashbulb are normally opened.

Upon depression of the shutter button or the like, the shutter release plate operatively coupled thereto is moved downwardly. When the brightness of scene is sufficient to actuate and permit the use of an automatic exposure control device, the displacements of both of a pointer pressure plate or control plate and a cam plate or stop control plate are limited by a pointer of an exposure meter so that the pointer pressure plate or control plate will not engage with and close the main underexposure warning switch. Therefore, the warning lamp is not turned on. When the brightness of scene is too dark to actuate and permit the use of the automatic exposure control device and if a flashbulb or flashbulb assembly is not mounted on the camera, a retaining member which is used to retain a trigger-pin-release plate closes the auxiliary underexposure warning switch. When the pointer-pressure plate or control plate is displaced a relatively long distance, the underexposure warning switch is closed to turn on the warning lamp. When the flashbulb that has been already fired or used is still mounted or is placed in the operative position, the auxiliary underexposure warning switch is opened and the release plate is moved beyond the normal position of a trigger pin of a flashbulb so that the switch for indication of a fired flashbulb is closed to turn on the warning lamp.

The above and other objects, features and advantages of the present invention will become more apparent from the following description of the preferred embodiment thereof taken in conjunction with the accompanying drawing.

Figure 1:
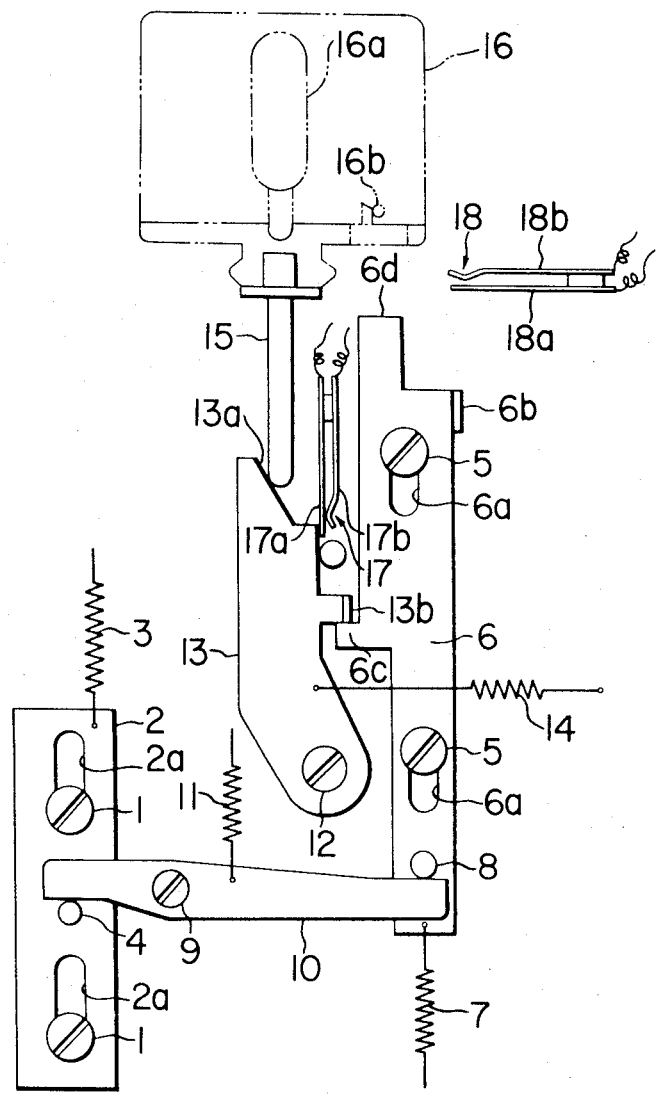
FIG. 1 is a schematic front view of a flash photography warning device in accordance with the present invention.

DESCRIPTION OF THE PREFERRED EMBODIMENT:

Slots 2a of a shutter release plate 2 are fitted over pins 1 extending from a stationary member of a camera body so that the shutter release plate 2 may be biased to slide upward under the force of a spring 3. The shutter release plate is operatively coupled to a shutter release button (not shown) so that it may be moved downward upon depression of the shutter button against the spring 3. A pin 4 extends from the shutter release plate 2. A release plate 6 has a pair of vertically spaced apart elongated slots 6a into which are fitted pins 5 extending from the stationary member so that the release plate 6 may be slidable and may be biased to normally move downward under the force of a spring 7 loaded between the release plate 6 and the stationary member. The release plate 6 is provided with an upright projection 6b, a horizontal projection 6c, a vertical projection 6d and a pin 8. An interconnecting lever 10 which is pivoted with a pin 9 is biased to rotate in the counterclockwise direction under the force of a spring 11 which is loaded between the lever 10 and the stationary member and is stronger than the spring 7 but weaker than the spring 3. The pins 4 and 8 engage with the ends of the interconnecting lever 10 so that the interconnecting lever 10 may rotate in response to the downward movement of the shutter release plate 2 thereby raising the release plate against the spring 7. The release plate 6 is adapted to be imparted with a strong force by a mechanism (not shown) when it starts to move upward in the manner described above.

A retaining lever or plate 13 which is pivoted with a pin 12 to the stationary member is biased to rotate in the clockwise direction under the force of a spring 14 loaded between the lever 13 and the stationary member. The retaining lever 13 is provided with a sloping surface 13a and a projection 13b which is positioned in engagement with the projection 6c of the release plate 6. Therefore, the upward movement of the release plate 6 may be normally prevented. The lower end of a sliding pin 15 rides over the sloping surface 13a of the retaining lever 13 so that the pin 15 may vertically move depending upon whether a flashbulb 16 is mounted or not. That is, when the flashbulb 16 is mounted, the sliding pin 15 is caused to move downward so that the lower end of the pin 15 pushes against the sloping surface 13a. As a consequence the retaining lever 13 is caused to rotate in the counterclockwise direction against the spring 14 so that the projection 13b is disengaged from the projection 6c of the release plate 6. On the other hand when the flashbulb 16 is not mounted, the sliding pin 15 may move upward to the position shown in FIG. 1.

An auxiliary underexposure warning switch 17 and a switch 18 adapted to indicate a fired flashbulb are mounted on the stationary member in such a manner that movable contact 17a of the underexposure warning switch 17 is normally positioned to make contact with the upper side edge of the retaining member 13 to normally close the switch 17 while a movable contact 18a of the switch 18 may be actuated by the upright projection 6b of the release plate 6 when it is moved upward. Therefore, when the flashbulb 16 is mounted so that the retaining lever 13 is rotated in the counterclockwise direction against the spring 14 in the manner described above, the movable contact 17a of the switch 17 is moved away from the fixed contact 17b so that the switch 17 is opened. When the release plate 6 is moved upwardly, the upright projection 6b engages with the movable contact 18a of the switch 18 to make contact with the fixed contact 18b so that the switch 18 is closed.

Figure 2:
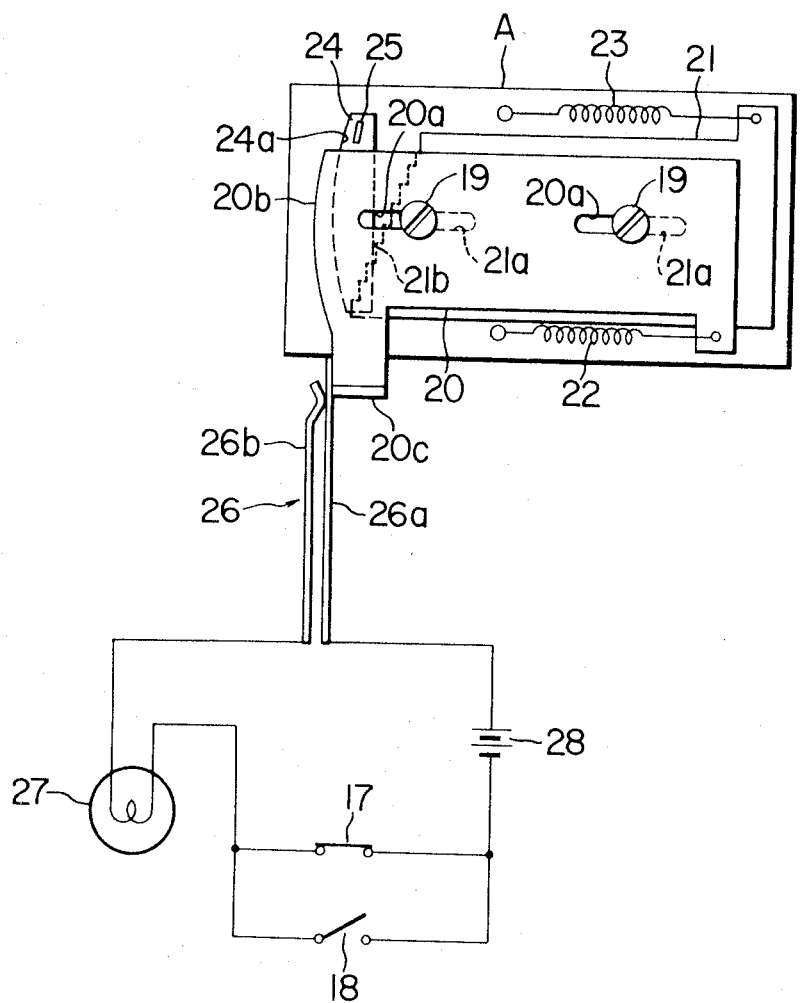
FIG. 2 is a circuit diagram thereof.

Pins 19 extending from a stationary base plate shown in FIG. 2 are fitted into elongated slots 20a of a pointer pressure plate or flash photography control plate 20 and a cam plate of stop control plate 21 so that they may slide over the base plate A. The control and cam plates 20 and 21 are normally biased to move to the left under the forces of springs 22 and 23 respectively. The control and cam plates 20 and 21 are started to move to the left by a mechanism (not shown) in response to the downward movement of the shutter release plate 2 so that an uprightly bent portion of a pointer 25 of an exposure meter (not shown) which is fitted into and swings through an arcuate slot 24 of the base plate A may engage with the leading side edges 20b and 21b of the control and cam plates 20 and 21 be pressed against the side edge 24a of the arcuate slot 24. The leading side edge 21b of the cam plate 21 is provided with a stepped cam surface as shown in FIG. 2 so that aperture blades (not shown) operatively coupled to the cam plate 21 may automatically open to give the optimum stop depending upon the step with which the pointer 25 engages, that is the displacement of the cam plate 21. When the shutter release plate 2 is returned to its normal position under the force of the spring 3, both of the control and cam plates 20 and 21 are returned to their normal positions. The arcuate leading side edge 20b of the control plate 20 has a width smaller than that of the arcuate slot 24, that is the angular range of deflection of the pointer 25 so that when the brightness of scene is enough to permit the use of an automatic exposure control mechanism, the pointer 25 may engage with the leading side edge 20b of the control plate 20, but when the brightness of scene is not enough to actuate the automatic exposure control mechanism the pointer 25 will not engage with the leading side edge 20b of the control plate 20 as shown in FIG. 2.

The control plate 20 is provided with a projection 20c which engages with a movable contact 26a of an underexposure warning switch 26 to establish contact with a fixed contact 26b to make the switch 26 close when the automatic exposure control mechanism is not actuated, but disengages from the movable contact 26a to allow it to move away from the fixed contact 26b to open the underexposure warning switch 26 when the automatic exposure control mechanism is actuated. An underexposure warning lamp 27 is so disposed as to be viewed in the field of an viewfinder and connected in series with the underexposure warning switch 26 and a power source 28. The auxiliary underexposure warning switch 17 and the switch 18 for indicating a fired flashbulb are connected in parallel between the warning lamp 27 and the power source 28.

Next the mode of operation will be described. When the brightness of scene is sufficient enough to actuate the automatic exposure control mechanism to give the optimum exposure factors, that is a shutter speed and a stop, the pointer 25 swings into the path of the control plate 20 so that its displacement is small when the shutter release button is depressed a little. As a consequence, the projection 20c does not engage with the movable contact 26a of the switch 26 so that the switch 26 is kept opened. Therefore, the warning lamp 27 is not lighted. The optimum stop is automatically selected in response to the displacement of the cam plate 21 in the manner described hereinbefore.

When the brightness of scene is not enough to actuate the automatic exposure control device, the control plate 20 is displaced a relatively long distance as it is not restrained by the pointer 25 as described previously so that the projection 20c engages with the movable contact 26a to close the switch 26. Therefore, the underexposure warning lamp 27 is turned on because the auxiliary underexposure warning switch 17 is normally closed. However, it should be noted that the shutter release button is not depressed sufficient enough to actuate the shutter release plate 2 when the warning lamp 27 is turned on so that an operator stops depressing the shutter release button and mounts a flashbulb 16. Therefore, the sliding pin 15 is caused to move downward to rotate the retaining lever 13 against the spring 14 in the counterclockwise direction so that the auxiliary underexposure warning switch 17 is opened in the manner described previously. Consequently the warning lamp 27 is turned off while the release plate 6 is disengaged from the retaining lever 13 so that it may move upward against the spring 7 as the shutter release plate 2 is moved downward. When a new flashbulb 16a is placed in position as shown in FIG. 1, a trigger pin 16b is in the position indicated in FIG. 1 so that the upward movement of the release plate 6 is prevented by the trigger pin 16b. In this case, the stroke of the upward movement of the release plate 6 is not enough to cause its projection 6b to engage with the movable contact 18a of the switch 18, so that the switch 18 is still kept opened. As a consequence the warning lamp 27 is not turned on. However, when a fired flashbulb is still in the position 16a in FIG. 1, there is no trigger pin at 16b, so that the free upward movement of the release plate 6 is permitted to cause its projection 16b to engage with the movable contact 18a of the switch 18. Therefore, the movable contact 18a is forced into contact with its fixed contact 18b so that the switch 18 is closed. As a consequence the warning lamp is turned on, giving the warning that the flashlamp 16 has been already fired once so that flash photography is not possible. In this case, the operator may also stop depressing the shutter release button and mount a new flashbulb before the shutter is released. When the new flashbulb is mounted, the shutter may now be released without causing the warning lamp to turn on and the release plate 6 is imparted with the strong force to move upward to strike the trigger pin 16b thereby firing the flashbulb 16.

In summary if the warning lamp 27 is turned on upon depression of the shutter release button when the flashbulb is mounted on the camera, it means that the brightness of scene is not enough and a flash photography is necessary. When the warning lamp 27 is turned on when the flashbulb is mounted, it means that the flashbulb mounted has been fired already so that a new flashbulb must be mounted. When the shutter is released without the warning lamp being turned on, it means that the optimum exposure has been given.

According to the present invention, the common warning lamp 27 may be used to indicate the underexposure and a fired flashbulb so that a warning device simple in construction and inexpensive to manufacture may be provided. Furthermore, since the two warnings may be indicated by the same lamp at the same position, the use of the camera may be much facilitated.

What is claimed is:

1. A flash photography warning device for use in an automatic exposure-control camera of the type adapted to mount a percussive flashbulb which is fired by application of mechanical impact, comprising
   a release plate adapted to move upwardly to engage with and release a trigger pin of a flashbulb in response to downward movement of a shutter release plate,
   a retaining plate which is normally held in one position at which said retaining plate is in engagement with said release plate to retain said upward movement thereof, but is displaced to another position when a flashbulb is mounted on the camera, to be disengaged from said release plate to permit said upward movement thereof,
   a warning lamp located in an electrical circuit,
   a first normally closed auxiliary underexposure warning switch connected in series with said warning lamp and which is adapted to be open in response to the displacement of said retaining plate to said other position,
   a normally open switch connected in parallel with said first switch and which is adapted to be closed when said release plate moves upward beyond the normal position of a trigger pin flashbulb that is mounted on the camera and not yet fired, in order to establish a warning lamp circuit when said underexposure warning switch is closed to give the warning that the flashbulb mounted has been already fired,
   exposure control means,
   a control plate movable to a limit position determined by engagement with said exposure control means,
   a second underexposure warning switch connected in series with said warning lamp and which is closed in response to a relatively long displacement which said control plate operatively coupled to a pointer of said exposure control meter makes when the brightness of a scene is not sufficient to actuate and permit the use of said automatic exposure control meter, said second underexposure warning switch being kept opened in response to a relatively small displacement which said control plate makes when said brightness is sufficient enough to actuate and permit the use of said automatic exposure control meter, and
   a power source for said automatic exposure control meter and said warning lamp.

2. A flash photography warning device for use in an automatic exposure-control camera of the flashbulb type comprising
   a flashbulb release plate adapted to move upwardly to cause firing of a flashbulb;
   a retaining plate normally engagable with said release plate and disengagable therefrom when a flashbulb is mounted on the camera;
   a warning lamp located in an electrical circuit;
   a first normally closed underexposure warning switch connected in series with said warning lamp and adapted to be opened when said retaining plate is disengaged from said release plate;
   a normally open switch connected in parallel with said first switch and adapted to be closed when said release plate moves to a predetermined position when a mounted flashbulb has been fired;
   exposure control means;
   a control plate movable to a limit position determined by engagement with said exposure control means; and
   a second underexposure warning switch connected in series with said warning lamp, said second switch closed by movement of said control plate to its limit position when there is absence of engagement by said exposure control means due to lack of brightness of scene being photographed so that the warning lamp is lit.

3. A warning device according to claim 2 in which said second switch is opened whereby said warning lamp is not lit when said control plate is engaged by said exposure control means due to sufficient brightness of scene being available.

4. A warning device according to claim 2 in which a shutter plate is provided to be actuated for movement by a shutter release, and a pivoting lever is provided interconnecting said shutter plate and said release plate to provide the movement of said release plate.

5. A warning device according to claim 4 in which said shutter plate is maintained in position by a first spring exerting a bias in one direction, said release plate is maintained in position by a second spring exerting a bias in the opposite direction, and said interconnecting lever is maintained in position by a third spring exerting a bias tending to cause said plates to move against the bias on each.

6. A warning device according to claim 5 in which the biasing force of said third spring is weaker than the biasing force of said first spring and stronger than the biasing force of said second spring.

7. A flash photography warning device for use in an automatic exposure-control camera of the flashbulb type comprising
    a flashbulb release plate adapted to move upwardly to cause firing of a flashbulb;
    a retaining plate normally engageable with said release plate and disengageable therefrom when a flashbulb is mounted on the camera;
    a warning lamp located in an electrical circuit;
    a first normally closed underexposure warning switch connected in series with said warning lamp and adapted to be opened when said retaining plate is disengaged from said release plate;
    a normally open switch connected in parallel with said first switch and adapted to be closed when said release plate moves to a predetermined position when a mounted flashbulb has been fired;
    exposure control means;
    a control plate movable to a limit position determined by engagement with said exposure control means; and
    a second underexposure warning switch connected in series with said warning lamp, said second switch closed by movement of said control plate to its limit position when there is absence of engagement by said exposure control means due to lack of brightness of scene being photographed so that the warning lamp is lit;
    said retaining plate being spring biased in a direction to maintain the engagement with said release plate, and said retaining plate including an inclined surface engageable by movement of a flashbulb element when a flashbulb is mounted causing movement of said retaining plate in a direction opposite to the bias of the spring to effect the disengagement with said release plate.

8. A flash photography warning device for use in an automatic exposure-control camera of the flashbulb type comprising
    a flashbulb release plate adapted to move upwardly to cause firing of a flashbulb;
    a retaining plate normally engageable with said release plate and disengageable therefrom when a flashbulb is mounted on the camera;
    a warning lamp located in an electrical circuit;
    a first normally closed underexposure warning switch connected in series with said warning lamp and adapted to be opened when said retaining plate is disengaged from said release plate;
    a normally open switch connected in parallel with said first switch and adapted to be closed when said release plate moves to a predetermined position when a mounted flashbulb has been fired;
    exposure control means;
    a control plate movable to a limit position determined by engagement with said exposure control means; and
    a second underexposure warning switch connected in series with said warning lamp, said second switch closed by movement of said control plate to its limit position when there is absence of engagement by said exposure control means due to lack of brightness of scene being photographed so that the warning lamp is lit;
    said release plate including a plurality of projections comprising a first projection providing the engagement with said retaining plate, a second projection effecting the firing of a flashbulb, and a third projection causing the closing of said normally open switch.

* * * * *